US009767147B2

(12) United States Patent
Freedman et al.

(10) Patent No.: US 9,767,147 B2
(45) Date of Patent: *Sep. 19, 2017

(54) METHOD OF CONVERTING QUERY PLANS TO NATIVE CODE

(71) Applicant: Microsoft Technology Licensing, LLC, Redmond, WA (US)

(72) Inventors: Craig Steven Freedman, Sammamish, WA (US); Erik Ismert, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,302

(22) Filed: Nov. 23, 2015

(65) Prior Publication Data

US 2016/0078084 A1    Mar. 17, 2016

Related U.S. Application Data

(63) Continuation of application No. 13/797,035, filed on Mar. 12, 2013, now Pat. No. 9,195,712.

(51) Int. Cl.
*G06F 17/30* (2006.01)

(52) U.S. Cl.
CPC .. *G06F 17/30436* (2013.01); *G06F 17/30463* (2013.01)

(58) Field of Classification Search
CPC .................. G06F 17/30463; G06F 17/300306
USPC ......................................... 707/718, 719, 720
See application file for complete search history.

(56) References Cited

U.S. PATENT DOCUMENTS

| 5,317,731 A | 5/1994 | Dias et al. |
| 5,369,761 A | 11/1994 | Conley |
| 5,625,815 A | 4/1997 | Maier |
| 5,812,996 A * | 9/1998 | Rubin ................. G06F 12/0866 |
| 5,875,334 A | 2/1999 | Chow et al. |
| 5,966,531 A | 10/1999 | Skeen et al. |
| 6,009,425 A | 12/1999 | Mohan |
| 6,122,644 A | 9/2000 | Graefe et al. |

(Continued)

OTHER PUBLICATIONS

Neumann, Thomas et al., "Compiling Database Queries into Machine Code", IEEE Data Eng. Bull. 31.1 (2014): 3-11.*

(Continued)

*Primary Examiner* — Mohammad S Rostami
*Assistant Examiner* — Ahmed Abraham
(74) *Attorney, Agent, or Firm* — Workman Nydegger

(57) ABSTRACT

Performing database queries. A method includes receiving a particular database query. The method further includes accessing a query plan based on the particular database query. The query plan has operators and specific operational parameters associated with each of the operators. The association of operators and specific operational parameters is specific to the particular database query. From the query plan, the method further includes instantiating a plurality of compiled code templates. Each code template includes executable code that when executed performs functionality of one of the operators from the query plan with the specific operational parameters applied in the compilation. The method further includes binding the code templates together using programmatic control flow to create a functioning program.

18 Claims, 3 Drawing Sheets

(56) References Cited

U.S. PATENT DOCUMENTS

| | | | |
|---|---|---|---|
| 6,195,677 B1 | 2/2001 | Utsumi | |
| 6,496,976 B1 | 12/2002 | Smith | |
| 6,665,701 B1 | 12/2003 | Combs et al. | |
| 6,772,363 B2 | 8/2004 | Pedone et al. | |
| 6,940,870 B2 | 9/2005 | Hamlin | |
| 6,971,096 B1 | 11/2005 | Ankireddipally et al. | |
| 6,990,513 B2 | 1/2006 | Belfiore et al. | |
| 7,089,244 B2 | 8/2006 | Shi et al. | |
| 7,093,231 B2 | 8/2006 | Nuss | |
| 7,103,597 B2 | 9/2006 | McGoveran et al. | |
| 7,111,023 B2 | 9/2006 | Norcott | |
| 7,120,703 B2 | 10/2006 | Li et al. | |
| 7,305,386 B2 | 12/2007 | Hinshaw et al. | |
| 7,675,871 B2 | 3/2010 | Garney et al. | |
| 7,694,284 B2 | 4/2010 | Berg et al. | |
| 7,707,195 B2 | 4/2010 | Nettleton et al. | |
| 7,739,223 B2 | 6/2010 | Vaschillo et al. | |
| 7,756,882 B2 | 7/2010 | Aharoni et al. | |
| 7,774,780 B2 | 8/2010 | Chow et al. | |
| 7,805,713 B2 | 9/2010 | Patel | |
| 7,984,043 B1 | 7/2011 | Waas | |
| 8,166,009 B2 | 4/2012 | Dunn et al. | |
| 8,464,261 B2 | 6/2013 | Moir et al. | |
| 8,527,501 B2 | 9/2013 | Horii | |
| 8,572,051 B1 | 10/2013 | Chen et al. | |
| 8,782,647 B2 | 7/2014 | Kajita | |
| 8,983,985 B2 | 3/2015 | Chen et al. | |
| 9,063,969 B2 | 6/2015 | Lee et al. | |
| 9,336,258 B2 | 5/2016 | Bhattacharjee et al. | |
| 2002/0100027 A1 | 7/2002 | Binding et al. | |
| 2002/0194503 A1 | 12/2002 | Faith et al. | |
| 2003/0140308 A1 | 7/2003 | Murthy et al. | |
| 2004/0073913 A1 | 4/2004 | Fairweather et al. | |
| 2004/0083465 A1 | 4/2004 | Zhang et al. | |
| 2004/0111698 A1 | 6/2004 | Soong et al. | |
| 2004/0205562 A1 | 10/2004 | Rozek et al. | |
| 2004/0249838 A1 | 12/2004 | Hinshaw | |
| 2005/0198041 A1 | 9/2005 | Lewandowski | |
| 2005/0273655 A1 | 12/2005 | Chow et al. | |
| 2006/0004696 A1* | 1/2006 | Day | G06F 17/3046 |
| 2006/0036574 A1 | 2/2006 | Schweigkoffer et al. | |
| 2006/0224563 A1* | 10/2006 | Hanson | G06F 17/30463 |
| 2008/0147698 A1* | 6/2008 | Gustafsson | G06F 17/30569 |
| 2009/0012980 A1* | 1/2009 | Stefani | G06F 17/30471 |
| 2009/0172641 A1 | 7/2009 | Wong | |
| 2009/0265249 A1 | 10/2009 | Bishop et al. | |
| 2009/0271763 A1 | 10/2009 | Varma et al. | |
| 2010/0036831 A1 | 2/2010 | Vemuri et al. | |
| 2010/0235860 A1 | 9/2010 | White et al. | |
| 2011/0029508 A1 | 2/2011 | Al-Omari et al. | |
| 2011/0060622 A1 | 3/2011 | Piersol et al. | |
| 2011/0131199 A1 | 6/2011 | Simon et al. | |
| 2011/0153566 A1 | 6/2011 | Larson et al. | |
| 2011/0238851 A1* | 9/2011 | Zhang | G06F 9/547 709/230 |
| 2011/0252000 A1 | 10/2011 | Diaconu et al. | |
| 2012/0109903 A1 | 5/2012 | Freedman et al. | |
| 2012/0203762 A1* | 8/2012 | Kakarlamudi | G06F 17/30463 707/718 |
| 2012/0209762 A1 | 8/2012 | Metaireau et al. | |
| 2012/0226945 A1 | 9/2012 | Johnson et al. | |
| 2013/0006964 A1* | 1/2013 | Hammerschmidt | G06F 17/30929 707/718 |
| 2013/0006993 A1 | 1/2013 | Kobayashi | |
| 2013/0191817 A1* | 7/2013 | Vorbach | G06F 8/4441 717/150 |
| 2014/0244597 A1 | 8/2014 | Freedman et al. | |
| 2014/0280030 A1 | 9/2014 | Freedman et al. | |
| 2014/0337393 A1 | 11/2014 | Burchall et al. | |
| 2015/0006466 A1 | 1/2015 | Tonder et al. | |
| 2015/0242439 A1 | 8/2015 | Freedman et al. | |
| 2016/0048553 A1 | 2/2016 | Freedman et al. | |

OTHER PUBLICATIONS

Office Action dated Aug. 11, 2016 cited in U.S. Appl. No. 14/188,145.

Office Action dated Jun. 17, 2016 cited in U.S. Appl. No. 14/829,325.

Office Action dated Mar. 7, 2016 cited in U.S. Appl. No. 14/188,145.

Notice of Allowance dated Oct. 24, 2016 cited in U.S. Appl. No. 14/829,325.

Zhao, et al., "Integrating Fault Tolerant CORBA and the CORBA Object Transaction Service", Published on: Sep. 13, 2006, Available at: http://academic.csuohio.edu/zhao_w/papers/icssea01.pdf.

U.S. Appl. No. 13/797,035, Ismert, et al., "Method of Converting Query Plans to Native Code", filed Mar. 12, 2013.

Hellerstein, "Architecture of a Database System", Foundations and Trends in Databases, vol. 1, No. 2, Sep. 2007, pp. 141-259, http://db.cs.berkeley.edu/papersfntdb07-architecture.pdf.

Oracle, Oracle Database Concepts, 13 Data Concurrency and Consistency, http://download.oracle.com/docs/cd/B19306_01/server.102/b14220/consist.htm.

Todd, "IBPhoenix Development: InterBase: What Sets It Apart", http://web.archive.org/web/20030408062029/http:/www.ibphoenix.com/mainnfs?a=ibphoneix&page=ibp_bill_todd_mga.

Author Unknown, PostgreSQL 9.0.1 Documentation Chapter 13. Concurrency Control Transaction Isolation, http://www.postgresql.org/docs/9.0/static/transaction-iso.html.

Blakeley, et al., "Distributed/Heterogeneous Query Processing in MicrosoftSQL Server", http://ieeexplore.ieee.org/Xplore/login.jsp?url=http%3A%2F%2Fieeexplore.ieee.org%2Fstamp.jsp%3Farnumber%3D01410211&authDecision=-201.

Author Unknown, Oracle® Rdb7 for Open VMS, http://download.oracle.com/otn_hosted_doc/rdb/pdf/rdbrn_7062.pdf.

First Office Action Received in China Patent Application No. 201110358461.2, Mailed Dated : Dec. 19, 2013, 12 Pages.

Second Office Action Received in China Patent Application No. 201110358461.2, Mailed Dated : Jul. 16, 2014, 6 Pages.

Yu, et al., "DryadLINQ: A System for General-Purpose Distributed Data-Parallel Computing Using a High-Level Language", In Proceedings of the 8th USENIX Conference on Operating Systems Design and Implementation, Dec. 8, 2008, 14 pages.

Le-Phuoc, et al., "A Native and Adaptive Approach for Unified Processing of Linked Streams and Linked Data", In Proceedings of 1th International Semantic Web Conference, Oct. 23, 2011, 16 pages.

Toman, et al., "Query Processing in Embedded Control Programs", In Proceedings of the VLDB International Workshop on Databases in Telecommunications II, Sep. 10, 2001, 20 pages.

Moore, Sheila, "Tuning PL/SQL Applications for Performance", Published Aug. 2009, Available at <<http://docs.oracle.com/cd/B28359_01/appdev.111/b28370/tuning.htm>>.

Neumann, Thomas, "Efficiently Compiling Efficient Query Plans for Modern Hardware", In Proceedings of the VLDB Endowment, vol. 4, Issue 9, Aug. 29, 2011, 12 pages.

Adhikari, et al., "D-Stampede: Distributed Programming System for Ubiquitous Computing", Jul. 2002, 8 pages.

Chiang, C., "High-Level Heterogeneous Distributed Parallel Programming", In Proceedings of the 2001 International Symposium on Information and Communication Technologies, Jun. 2004, 6 pages.

Commins, M., "JXTA, in Support of the Migration of users Across Smart Spaces", Sep. 2002, 100 pages.

Karimi, K., et al., "Transparent Distributed Programming under Linux", May 14-17, 7 pages.

Boukottaya, et al., "Automating XML documents transformations: a conceptual modelling based approach", Jan. 2004, pp. 81-90. Available at <<http://delivery.acm.org/10.1145/980000/976307/p81-boukottaya.pdf>>.

(56) References Cited

OTHER PUBLICATIONS

Amer-Yahia, et al., "A comprehensive solution to the XML-to-relational mapping problem", Nov. 2004, pp. 31-38. Available at <<http://delivery.acm.org/10.1145/1040000/1031461/p31-amer-yahia.pdf>>.
He, et al., "Statistical schema matching across web query interfaces", Jun. 2003, pp. 217-228. Available at <<http://delivery.acm.org/10.1145/880000/872784/p217-he.pdf>>.
International Search Report & Written Opinion Issued in PCT Patent Application No. PCT/US2015/016723, Mailed Date: May 4, 2015, 10 Pages.
U.S. Appl. No. 12/915,994, Jun. 26, 2012, Office Action.
U.S. Appl. No. 12/915,994, Jan. 23, 2013, Office Action.
U.S. Appl. No. 12/915,994, Sep. 24, 2013, Office Action.
U.S. Appl. No. 12/915,994, Mar. 7, 2014, Notice of Allowance.
U.S. Appl. No. 14/272,074, Mar. 30, 2015, Notice of Allowance.
U.S. Appl. No. 13/797,035, Apr. 6, 2015, Office Action.
U.S. Appl. No. 11/613,046, Nov. 29, 2010, Office Action.
U.S. Appl. No. 11/613,046, Jan. 28, 2011, Notice of Allowance.
U.S. Appl. No. 13/797,035, Jul. 17, 2015, Notice of Allowance.
Neumann, Thomas et al., "Compiling Database Queries into Machine Code", IEEE Data Eng. Bull. 31.1 (2014):3-11.
Office Action dated Jun. 1, 2017 cited in U.S. Appl. No. 14/188,145 (Copy Attached).

* cited by examiner

METHOD OF CONVERTING QUERY PLANS TO NATIVE CODE

CROSS-REFERENCE TO RELATED APPLICATIONS

This application is a continuation of U.S. patent application Ser. No. 13/797,035, filed Mar. 12, 2013, and entitled "METHOD OF CONVERTING QUERY PLANS TO NATIVE CODE," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Data in computing systems is often stored in one or more databases. A database is a collection of related data. Data in the database are commonly organized in a two-dimensional row and column form called a table. A database typically includes multiple tables and multiple associative structures. A table is an object in the database containing zero or more records and at least one field within each record. A record may be embodied as a row in the table that is identified by a unique numeric called a record identifier. A field is a subdivision of a record to the extent that a column of data in the table represents the same field for each record in the table. An example of an associative structure in a database is an index, typically, but not necessarily, a form of B-tree or hash index. Associative structures are transparent to users of a database but are important to efficient operation and control of the database management system. A database management system is a control system that supports database features including, but not limited to, storing data on a memory medium, retrieving data from the memory medium and updating data on the memory medium.

A query is used to access or update data in a database. The query is typically constructed in a variant of Structured Query Language (SQL) that may or may not be compliant with the American National Standards Institute (ANSI) standard SQL definition. A SQL query is non-procedural in that it specifies the objective or desired result of the query in a language meaningful to a user but does not define the steps or procedure by which the query should be accomplished. When a SQL query is applied to a database, the query optimizer of the database management system processes the non-procedural query to create an execution plan. An execution plan is procedural in that it determines the order and type of operations or operators to be performed to carry out the objectives of the SQL query. The combination of non-procedural queries and procedural execution plans creates both the opportunity and the need for automatic planning of execution plans by the query optimizer. A query optimizer can generate a plurality of different query plans for any given SQL query and is typically configured to generate a query plan according to efficiency objectives.

Thus, traditional query processors use inefficient interpreter based execution strategies for query execution. An interpreter is a program which executes another program either by operating directly on the source code or by operating on a lower level representation of the source code. The interpreter is statically written code while the program that is executed by the interpreter is, at least in some sense, data that is processed by the interpreter. Processing a query using only an interpreter can be slow.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for performing database queries. The method includes receiving a particular database query. The method further includes accessing a query plan based on the particular database query. The query plan has operators and specific operational parameters associated with each of the operators. The association of operators and specific operational parameters is specific to the particular database query. From the query plan, the method further includes instantiating a plurality of code templates. Each code template includes executable code that when executed performs functionality of one of the operators from the query plan with the specific operational parameters applied. The method further includes binding the code templates together using programmatic control flow to create a functioning program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
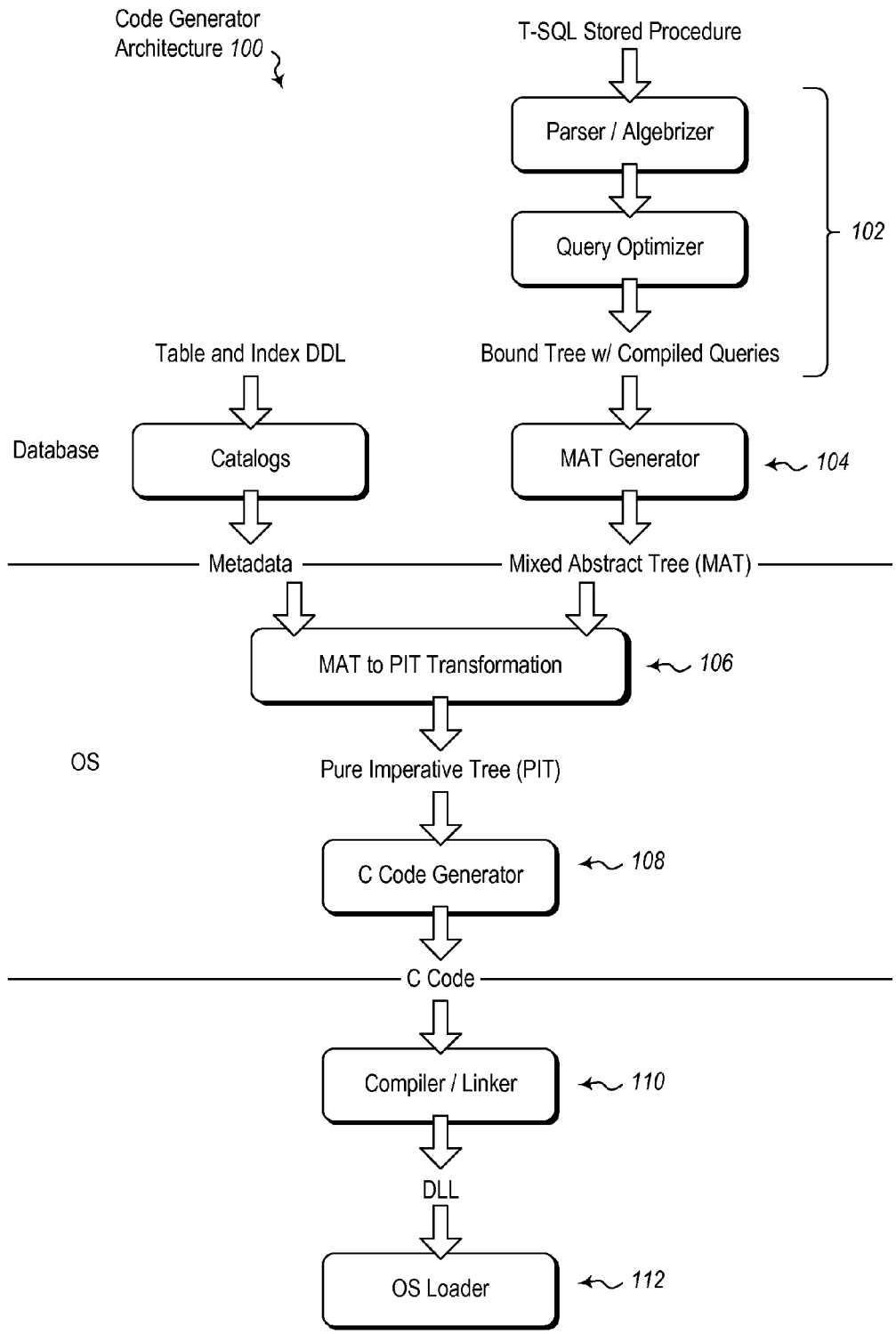
FIG. 1 illustrates the overall architecture of a code generator.

Embodiments described herein include functionality for converting query plans into native code that can execute significantly faster than traditional query plan methods achieve. When a query is applied to a database, the query optimizer of the database management system processes the non-procedural query to create an execution plan, or query plan as discussed herein. The use of labels and goto style flow control can be used to link operators. Further, a compiler backend can be used to optimize the final code. This approach can be used to achieve fewer instructions executed and smaller binaries. Some embodiments have the ability to handle virtually any operators within this framework.

As noted above, an interpreter is a program which executes another program either by operating directly on the source code or by operating on a lower level representation of the source code. The interpreter is statically written code while the program that is executed by the interpreter is, at least in some sense, data that is processed by the interpreter. Often the generation of a lower level representation is still referred to as "compilation". Nevertheless, this type of compilation is distinct from compiled languages such as C or C++ in which the compiler translates a program into native machine code which can be executed directly by the processor. In the case of databases, such as SQL Server®, these databases include a "compilation step." However, the output of the compilation step is usually a query plan (i.e., data) that is interpreted by statically written code (i.e., the interpreter). In contrast, embodiments described herein translate database queries into native machine code such that it can be executed natively by the processor.

Embodiments may be configured to attempt to maximize computation at compile time. Embodiments maximize run time performance by converting query language (such as SQL in the examples illustrated herein) statements and stored procedures into highly customized native code. Embodiments support efficient execution of a "compile once and execute many times" workload as opposed to optimizing the execution of ad hoc queries (although some embodiments could, in fact, be used to optimize ad hoc queries). Embodiments also implement a high level of language compatibility to ease the migration of existing database (such as SQL Server® available from Microsoft® corporation of Redmond Wash.) applications to memory optimized tables and natively compiled stored procedures. Consequently, embodiments leverage and reuse technology wherever suitable. Embodiments reuse much of the database compilation stack including the metadata, parser, name resolution, type derivation, and query optimizer. This tight integration helps embodiments to achieve syntactic and semantic equivalence with existing database query languages (such as for example, T-SQL). Moreover, the output of the code generator, in some embodiments, is code that needs to be compiled, such as C code and embodiments leverage the compiler, such as the Visual C/C++ compiler to convert that code into native code. While C code is illustrated, it should be appreciated that other languages and compilers may be used additionally or alternatively.

Embodiments may further preserve the ad hoc feel of the database language. Thus, a table and stored procedure is available for use immediately after it is created. To create a main memory optimized table or a natively compiled stored procedure, the user merely needs to add some additional syntax to the CREATE TABLE or CREATE PROCEDURE SQL statement or similar statements in other frameworks. Code generation is completely transparent to the user.

FIG. 1 illustrates the overall architecture of a code generator. In some embodiments, there are three main points where embodiments invoke the code generator. The first is during memory optimized table creation. The second is during table type creation. And the third is during natively compiled stored procedure creation. As noted above, embodiments begin by reusing the existing database compilation stack 102. Embodiments convert the output of this process into a data structure called the mixed abstract tree or MAT, as illustrated by the MAT generator 104. This data structure is a rich abstract syntax tree capable of representing metadata, imperative logic, expressions, and query plans. Embodiments then transform the MAT into a second data structure referred to herein as a pure imperative tree or PIT, as illustrated at 106. The PIT is a much "simpler" data structure that can be directly converted to C code, as illustrated at 108 (or theoretically directly into the intermediate representation for a compiler backend such as Low Level Virtual Machine (LLVM) code). The details of the MAT to PIT transformation are discussed further below. Once embodiments have C code, embodiments invoke the Visual C/C++ compiler and linker 110 to produce an executable file, such as in some system available from Microsoft® Corporation of Redmond Wash., a DLL. At this point it is just a matter of using the operating system loader 112 to bring the newly generated code into the database address space where it can be executed.

The following illustrates reasoning for why table creation also uses code generation. Some embodiments may implement a storage engine that treats records as opaque objects. The storage engine has no knowledge of the internal content or format of records and cannot directly access or process the data in records. The code generator 108 provides the engine with customized callback functions for each table. These functions perform tasks such as computing a hash function on a key or record, comparing two records, and serializing a record into a log buffer. Because these functions are compiled into native code, index operations such as inserts and searches are extremely efficient.

There are numerous challenging problems that embodiments address to translate stored procedures written in a database query language such as T-SQL into code compliable to machine code such as C code. One challenge is the transformation of query plans into C code. There are, however, many other noteworthy complications. For example, the T-SQL and C type systems and expression semantics are very different. T-SQL includes many data types such as date/time types and fixed precision numeric types that have no corresponding C data types. In addition, T-SQL supports NULLs while C does not. Finally, T-SQL raises errors for arithmetic expression evaluation failures such as overflow and divide by zero while C either silently returns a wrong result or throws an OS exception that must be translated into an appropriate T-SQL.

These complexities can be overcome by performing the intermediate step of converting the MAT into the PIT rather than directly generating C code. The PIT is a data structure that can be easily manipulated, transformed, and even generated out of order in memory. It is much more challenging to work directly with C code in text form.

The following now addresses the issue of the transformation of query plans into C code. To aid in this, consider the simple T-SQL example in the following very specific, and non-limiting code example:

```
CREATE PROCEDURE SP_Example @id INT
WITH NATIVE_COMPILATION, SCHEMABINDING, EXECUTE AS
OWNER AS
BEGIN ATOMIC WITH (TRANSACTION ISOLATION LEVEL =
SNAPSHOT, LANGUAGE = 'English')
    SELECT Name, Address, Phone FROM dbo.Customers WHERE
    Id = @id
END
```

Figure 2:
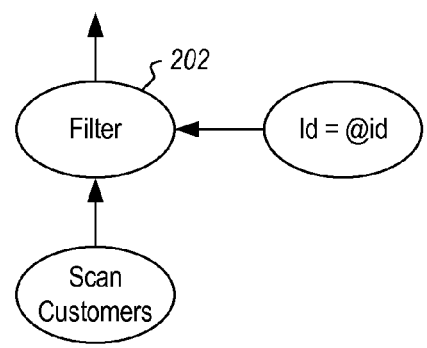
FIG. 2 illustrates a possible plan for executing a sample query.

This procedure retrieves a customer name, address, and phone number given a customer id. The procedure declaration also includes some additional syntax. As with many query execution engines, embodiments begin with a query plan which is constructed out of operators such as scans, joins, and aggregations. FIG. 2 illustrates one possible plan for executing the sample query above. For this example, embodiments are naively assuming that the database administrator has not created an index on Customer.Id and that the predicate is instead evaluated via a filter operator 202. In practice, for this example lacking an index, embodiments push the predicate down to the storage engine via a callback function. However, this example uses the filter operator 202 to illustrate a somewhat more interesting outcome.

Figure 3:
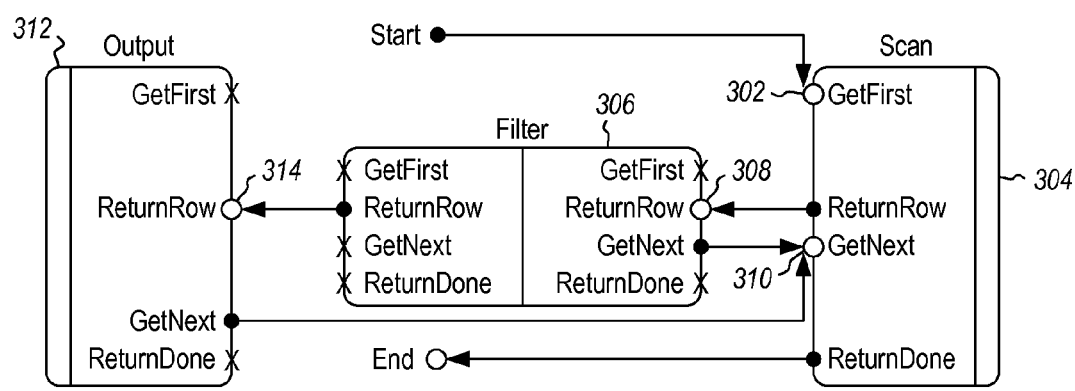
FIG. 3 illustrates a graphical version of a template.

Each operator implements a common interface so that they can be composed into arbitrarily complex plans. In the present example, this interface includes "get first," "get next," "return row," and "return done." While all operators implement "get first" and "get next" exactly once, an operator implements "return row" and "return done" once per child. Leaf operators such as scans do not implement the return "interfaces" at all while joins would implement them twice. Other embodiments could use other interfaces such as "open" and "get next" instead of "get first" and "get next". However, unlike most query execution engines, embodiments do not implement these interfaces using functions. Instead, embodiments collapse an entire query plan into a single function using labels and gotos to implement and connect these interfaces. FIG. 3 illustrates graphically how the operators for the present example are interconnected. Each hollow circle represents a label while each arrow represents a goto statement. In many cases, embodiments can directly link the code for the various operators bypassing intermediate operators entirely. The X's represent labels and gotos that have been optimized out in just such a fashion. In conventional implementations, these same scenarios would result in wasted instructions where one operator merely calls another without performing any useful work.

Execution of the code represented by FIG. 3 begins by transferring control directly to the GetFirst entry point 302 of the scan operator 304. Note already the difference as compared to traditional query processors which typically begin execution at the root of the plan and invoke repeated function calls merely to reach the leaf of the tree even when the intermediate operators have no work to do as in this example. Presuming the Customers table is not empty, the scan operator 304 retrieves the first row and transfers control to the filter operator 306 ReturnRow entry point 308. The filter operator 306 evaluates the predicate and either transfers control back to the scan operator 304 GetNext entry point 310 if the current row does not qualify or to the output operator 312 entry point 314 if the row qualifies. The output operator 312 adds the row to the output result set to be returned to the client and then transfers control back to the scan operator 304 GetNext entry point 310 again bypassing the filter operator 306. When the scan operator 304 reaches the end of the table, execution terminates immediately. Again there is no need to pass control back through any intermediate operators.

This design is extremely flexible and can support virtually any query operator including blocking (e.g., sort and group by aggregation) and non-blocking (e.g., nested loops join) operators. Further, embodiments can support outer joins more efficiently compared to some other alternatives. In an outer join, it is often necessary to transfer control to a parent operator's "return row" entry point from more than one location (e.g., for joined rows and for null extended rows). Some code generation schemes are forced either to replicate code or revert to function calls to handle outer joins. Given that embodiments link the operators using control flow, such as goto statements, embodiments enable a child to "return" control to its parent from more than one location without sacrificing efficiency.

The illustrated control flow mechanism is also flexible enough to handle operators such as merge join that alternate between multiple input streams. By keeping all of the generated code in a single function, embodiments avoid costly argument passing between functions and expensive function calls. Although the resulting code is often challenging to read due in part to the large number of goto statements, it is important to keep in mind that the intent is not to produce code for human consumption.

Embodiments may rely on a compiler to generate efficient code. The compiler does so through inspection of samples of the resulting assembly code.

There are cases where it may not make sense to generate custom code. For example, the sort operator is best implemented using a generic sort implementation with a callback function to compare records. Some functions (e.g., non-trivial math functions) are either sufficiently complex or expensive that it makes sense to include them in a library and call them from the generated code.

With minor exceptions, natively compiled stored procedures look and feel just like any other T-SQL stored procedures. Embodiments may be implemented to support most of the T-SQL imperative surface area including parameter and variable declaration and assignment as well as control flow and error handling (IF, WHILE, RETURN, TRY/CATCH, and THROW). Embodiments support SELECT, INSERT, UPDATE, and DELETE. Some embodiments may support queries that can include inner joins, sort and top sort, and basic scalar and group by aggregation. However other embodiments may support various other operators.

In an effort to minimize the number of run time checks and operations that are performed each time a natively compiled stored procedure is executed, embodiments do impose some requirements. The following illustrates four requirements that may be implemented in some embodiments. Note that these restrictions are not necessarily required, but may be implemented to improve performance of some embodiments.

First, unlike a conventional stored procedure which upon execution can inherit run time options from the user's environment (e.g., to control the behavior of NULLs, errors, etc.), natively compiled stored procedures support a very limited set of options and those few options that can be controlled are set at compile time. This policy both reduces the complexity of the code generator as there are fewer scenarios that embodiments need to support and improves the performance of the generated code by eliminating unnecessary run time checks.

Second, natively compiled stored procedures execute in a security or user context that is predefined when the procedure is created rather than in the context of the user who executes the procedure. This requirement allows embodiments to run all permission checks once at procedure creation time instead of once per execution.

Third, natively compiled stored procedures are schema bound. This restriction means that once a procedure is created, any tables referenced by that procedure are not dropped without first dropping the procedure. This requirement avoids the need to acquire costly schema stability locks before executing the procedure.

Fourth, natively compiled stored procedures execute in the context of a single transaction. This requirement is enforced, in some embodiments, through the use of the BEGIN ATOMIC statement (and the prohibition of explicit BEGIN, COMMIT, and ROLLBACK TRANSACTION statements) and ensures that a procedure does not have to block or context switch midway through to wait for commit.

Finally, it is worth mentioning that as embodiments may implement a commercial database product, embodiments take security into account in all aspects of the design. Of particular concern is the possibility of a "C injection attack" in which a malicious user might include C code in a T-SQL identifier (e.g., a table, column, procedure, or variable name) or string literal in an attempt to induce the code generator to copy this code into the generated code. To ensure that such an attack is not possible, embodiments may be implemented to not include any user identifier names or data in the generated code, even as comments.

Some embodiments may implement an additional mechanism that enables the conventional query execution engine to access memory optimized tables. This feature, referred to herein as query interop, enables several important scenarios including: (1) import and export of data to and from memory optimized tables using the existing tools and processes that already work for standard tables; (2) support for ad hoc queries and data repair; (3) feature completeness, (for example, users can leverage interop to execute virtually any legal SQL query against memory optimized tables and can use features such as views and cursors that are not supported in natively compiled stored procedures); support for transactions that access both memory optimized and standard tables; and ease of app migration (existing tables can be converted to memory optimized tables without requiring extensive work to convert existing stored procedures into natively compiled stored procedures).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
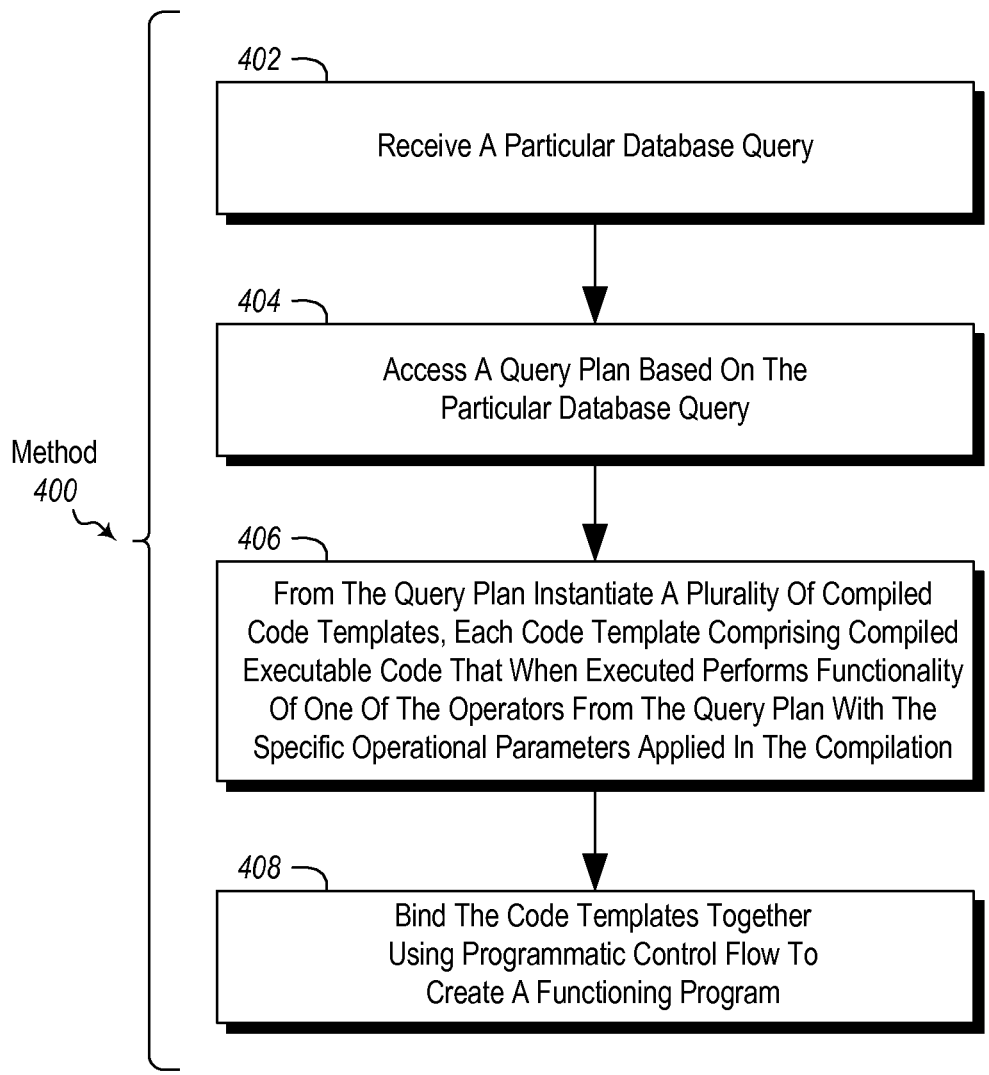
FIG. 4 illustrates a method of performing database queries

Referring now to FIG. 4, a method 400 is illustrated. The method 400 includes acts for performing database queries. The method 400 includes receiving a particular database query (act 402). For example, the query could be a SQL Server® based query.

The method 400 further includes accessing a query plan based on the particular database query (act 404). The query plan includes operators and specific operational parameters associated with each of the operators. The association of operators and specific operational parameters is specific to the particular database query. In particular, the query plan in not just a generalized set of operators, but rather includes specific details instantiated for a particular query.

The method 400 further includes from the query plan instantiating a plurality of compiled code templates, each code template comprising compiled executable code that when executed performs functionality of one of the operators from the query plan with the specific operational parameters applied in the compilation (act 406). Thus the code templates, again, are not just generalized code templates, but rather are code templates for operators, with parameter applied, for a specific query.

The method 400 further includes binding the code templates together using programmatic control flow to create a functioning program (act 408). For example, in some embodiments, the programmatic control flow comprises labels and gotos.

The method 400 may be practiced where instantiating the plurality of code templates and binding the code templates together is performed to generate functioning machine code program.

The method 400 may be practiced where instantiating a plurality of code templates includes: creating one or more abstract syntax trees that represent metadata, imperative logic, expressions and query plans; and transforming the abstract syntax trees to one or more simpler data structures. An example of this is illustrated above, where MAT is generated and the MAT is transformed into the PIT. In some such embodiment, the one or more simpler data structures can be converted directly to C code. Alternatively or additionally, the one or more simpler data structures can be converted directly to low level machine code. Alternatively or additionally, in some such embodiments, instantiating a plurality of code templates may include using a compiler to optimize code for the functioning program.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for translating database queries into native machine code so that use of an interpreter which employs statically written code to process a given query can be eliminated, to improve efficiency of processing the given query, the computer-implemented method being performed by one or more processors executing computer-executable instructions for the computer-implemented method, and the computer-implemented method comprising:
   receiving a particular database query;
   accessing a query plan based on the particular database query, the query plan having operators and specific operational parameters associated with each of the operators, the association of operators and specific operational parameters being specific to the particular database query;
   from the query plan generating one or more mixed abstract trees that represent metadata, imperative logic, expressions and query plans; and
   based on the one or more mixed abstract trees, using programmatic control flow to create code from which native machine code for the particular database query can be compiled and executed natively without having to process the query plan using an interpreter which employs statically written code, and wherein using said programmatic control flow comprises:
      transforming the one or more mixed abstract trees into one or more simpler data structures which are convertible to said machine executable code; and
      binding the one or more simpler data structures to create the native machine code for the particular database query that can be executed natively without having to process the query plan using an interpreter which employs statically written code.

2. The computer-implemented method of claim 1, wherein the programmatic control flow comprises labels and goto statements.

3. The computer-implemented method of claim 2, wherein the labels and goto statements of the programmatic flow control do not require passing control back through any intermediate operators.

4. The computer-implemented method of claim 1, wherein the programmatic flow control enables a child to return control to the child's parent from more than one location.

5. The computer-implemented method of claim 1, wherein the one or more simpler data structures comprise one or more pure imperative tree structures that can be converted directly to low level machine code.

6. The computer-implemented method of claim 1, wherein the one or more mixed abstract trees comprise one or more abstract syntax trees that represent metadata, imperative logic, expression and query plans.

7. A computing system for translating database queries into native machine code so that use of an interpreter which employs statically written code to process a given query can be eliminated, to improve efficiency of processing the given query, the system comprising:
   one or more computer readable media comprise computer executable instructions;
   one or more processors which, when executing the computer-executable instructions, cause the computing system to be configured with a code generator architecture for translating database queries into native machine code so that use of an interpreter which employs statically written code to process a given query can be eliminated, to improve efficiency of processing the given query, and wherein the code generator architecture performs the following:
   receives a particular database query;
   access a query plan based on the particular database query, the query plan having operators and specific operational parameters associated with each of the operators, the association of operators and specific operational parameters being specific to the particular database query;

from the query plan, generates one or more mixed abstract trees that represent metadata, imperative logic, expressions and query plans; and based on the one or more mixed abstract trees, uses programmatic control flow to create code from which native machine code for the particular database query can be compiled and executed natively without having to process the query plan using an interpreter which employs statically written code, and wherein using the programmatic control flow comprises:

transforming the one or more mixed abstract trees into one or more simpler data structures which are convertible to said machine executable code; and binding the one or more simpler data structures to create the native machine code for the particular database query that can be executed natively without having to process the query plan using an interpreter which employs statically written code.

8. The computing system of claim 7, wherein the programmatic control flow comprises labels and goto statements.

9. The computing system of claim 8, wherein the labels and goto statements of the programmatic flow control do not require passing control back through any intermediate operators.

10. The computing system of claim 7, wherein the programmatic flow control enables a child to return control to the child's parent from more than one location.

11. The computing system of claim 7, wherein the one or more simpler data structures comprise one or more pure imperative tree structures that can be converted directly to low level machine code.

12. The computing system of claim 7, wherein the one or more mixed abstract trees comprise one or more abstract syntax trees that represent metadata, imperative logic, expression and query plans.

13. A physical storage computer medium comprising computer executable instructions that when executed by one or more processors causes execution of a computer-implemented method for translating database queries into native machine code so that use of an interpreter which employs statically written code to process a given query can be eliminated, to improve efficiency of processing the given query, and wherein the computer-executable method is performed by:

receiving a particular database query;

accessing a query plan based on the particular database query, the query plan having operators and specific operational parameters associated with each of the operators, the association of operators and specific operational parameters being specific to the particular database query;

from the query plan generating one or more abstract syntax trees that represent metadata, imperative logic, expressions and query plans;

using programmatic control flow to create code from which native machine code for the particular database query can be compiled and executed natively without having to process the query plan using an interpreter which employs statically written code, and wherein using said programmatic control flow comprises:

transforming the abstract syntax trees to one or more simpler data structures which are convertible to said machine executable code; and binding the one or more simpler data structures using programmatic control flow to create native machine code for the particular database query that can be executed natively without having to process the query plan using an interpreter which employs statically written code.

14. The physical storage computer medium of claim 13, wherein the programmatic control flow comprises labels and goto statements.

15. The physical storage computer medium of claim 14, wherein the labels and goto statements of the programmatic flow control do not require passing control back through any intermediate operators.

16. The physical storage computer medium of claim 14, wherein the programmatic flow control enables a child to return control to the child's parent from more than one location.

17. The physical storage computer medium of claim 14, wherein the one or more simpler data structures comprise one or more pure imperative tree data structures.

18. The physical storage medium of claim 17, wherein the one or more pure imperative tree data structures can be converted directly to C code or to low level machine code.

* * * * *